United States Patent
Miyazawa (10) Patent No.: US 11,998,994 B2
(45) Date of Patent: Jun. 4, 2024

(54) HOLDER FOR HOLDING A PLATE-LIKE MEMBER AND CUTTING INSERT

(71) Applicant: TUNGALOY CORPORATION, Fukushima (JP)

(72) Inventor: Shunsuke Miyazawa, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 15 days.

(21) Appl. No.: 17/518,196

(22) Filed: Nov. 3, 2021

(65) Prior Publication Data

US 2022/0212269 A1 Jul. 7, 2022

(30) Foreign Application Priority Data

Jan. 5, 2021 (JP) .................................. 2021-000529

(51) Int. Cl.
*B23B 27/16* (2006.01)
(52) U.S. Cl.
CPC .................................. *B23B 27/16* (2013.01)
(58) Field of Classification Search
CPC ......... B23B 29/04; B23B 29/12; B23B 29/14; B23B 29/20; B23B 2205/04; B23B 2205/02; B23B 2205/125; B23B 2110/02; B23B 2110/08; B23B 27/16; B23B 27/1666
See application file for complete search history.

(56) References Cited

U.S. PATENT DOCUMENTS

| 5,993,118 | A | 11/1999 | Brask et al. |
| 2013/0156516 | A1 | 6/2013 | Hecht |
| 2014/0050542 | A1 | 2/2014 | Zeeb et al. |
| 2018/0272431 | A1 | 9/2018 | Athad |
| 2019/0176244 | A1* | 6/2019 | Harouche ............... B23B 27/08 |
| 2019/0240741 | A1* | 8/2019 | Hecht ................... B23B 29/043 |

FOREIGN PATENT DOCUMENTS

| AT | 5887 U1 | 1/2003 |
| EP | 2082820 A2 | 7/2009 |
| JP | H11-010411 A | 1/1999 |
| JP | 2019-526459 A | 9/2019 |
| JP | 2020-104225 A | 7/2020 |
| WO | 2018/047162 A1 | 3/2018 |

* cited by examiner

*Primary Examiner* — Alan Snyder
*Assistant Examiner* — Reinaldo A Vargas-Del Rio
(74) *Attorney, Agent, or Firm* — Studebaker & Brackett PC (57) ABSTRACT

The present disclosure improves the machining conditions and enhances the quality of machined surfaces, particularly in cutting off and grooving machining when the projection amount of a plate-like member is large. A blade, which is a plate-like member having a polygonal shape and used for cutting machining, includes: a plurality of insert pockets; and recess portions formed by partial cutting corresponding to insert pockets respectively. A holder includes: a holder main portion; and a support portion with which a part of the recess portion formed in the blade contacts. The holder is configured in which the blade can be installed in a state where the part of the recess portion can contact with the support portion.

8 Claims, 9 Drawing Sheets

HOLDER FOR HOLDING A PLATE-LIKE MEMBER AND CUTTING INSERT

BACKGROUND

Field

The present disclosure relates to a plate-like member used for a cutting tool, a holder, and a cutting tool.

Description of Related Art

For grooving machining and cutting off machining, a tool block type tool equipped with a tool block to hold a plurality of cutting inserts (e.g. see Patent Publication JP2020-104225A), and a shank type tool having a structure of supporting a blade to hold a cutting insert by a shank (e.g. see Patent Publication JPH11-010411A and Patent Publication JP2019-526459A) have been proposed. For example, as a blade for cutting off machining, conventionally a rectangular plate blade including one or two insert pockets is available, and a blade including three or more insert pockets and having high economic efficiency have also been proposed (e.g. see Patent Publication JPH11-010411A and Patent Publication JP2019-526459A).

SUMMARY

A problem of a tool that combines a blade including a plurality of pockets and a tool block is that the rigidity of the tool drops. In other words, in a conventional cutting off machining, for example, the projection amount of the blade increases as the cutting off machining diameter increases, and the rigidity of the tool decreases accordingly. The drop in rigidity of the tool could cause a defect in machined surfaces and deteriorate the cutting off straightness. In some cases, this becomes a reason why machining conditions cannot be improved. Therefore in the grooving machining and cutting off machining in which the projection amount is large, it is desired to improve the machining conditions and quality of machined surfaces. The above problem also occurs to a shank type tool having a structure of supporting the blade with the shank.

With the foregoing in view, it is an object of the present disclosure to provide a plate-like member, used for a cutting tool, a holder, and a cutting tool, which can improve the machining conditions, and increase the quality of the machined surfaces particularly in a grooving and cutting off machining in which the projection amount of the blade is large.

An aspect of the present disclosure is a plate-like member, having a polygonal shape and used for a cutting tool, and including: a plurality of insert pockets; and recess portions formed by partial cutting corresponding to the insert pockets respectively.

Another aspect of the present disclosure is a plate-like member that is used for grooving machining and/or cutting off machining.

Another aspect of the present disclosure is a cutting tool including: the above mentioned plate-like member, and an insert that is held in an insert pocket of the plate-like member.

Another aspect of the present disclosure is a holder that holds the above mentioned plate-like member and an insert. The holder includes a holder main portion and a support portion with which a part of the recess portion formed in the plate-like member contacts, and is configured in which the plate-like member can be installed in a state where the part of the recess portion can contact with the support portion.

In this holder or the cutting tool including this cutting holder, the part of the recess portion formed in the plate-like member (also referred to as a "blade" herein below), contacts with the support portion of the holder, whereby the plate-like member is constrained in the holder. This configuration allows the plate-like member to contact with the holder up to the part near the front end thereof. Thereby the generation of deflection and chattering of the plate-like member can be suppressed.

The support portion in the above mentioned holder may be formed at a position where the force applied to the plate-like member is received during machining.

The support portion of the above mentioned holder may be formed on an edge of the holder.

The above mentioned holder may include a positioning projection that determines a position of the plate-like member when the plate-like member is installed in the holder.

In the above mentioned holder, in a part of a portion where the plate-like member is installed, a relief portion that is concaved in a thickness direction of the plate-like member may be formed.

The relief portion in the above mentioned holder may be formed at a predetermined depth, where a deflected portion of the plate-like member, which is deflected for a predetermined amount in the thickness direction due to an influence of machining, is not contacted.

The above mentioned holder may include a constraint surface that contacts with a part of a lathe device in which the holder is installed, and restricts movement of the holder in a longitudinal direction.

The above mentioned holder may further include a rib that is formed on the constraint surface or a vicinity thereof.

DETAILED DESCRIPTION

Preferred embodiments of the present disclosure will be described in detail with reference to the drawings.

Figure 7:
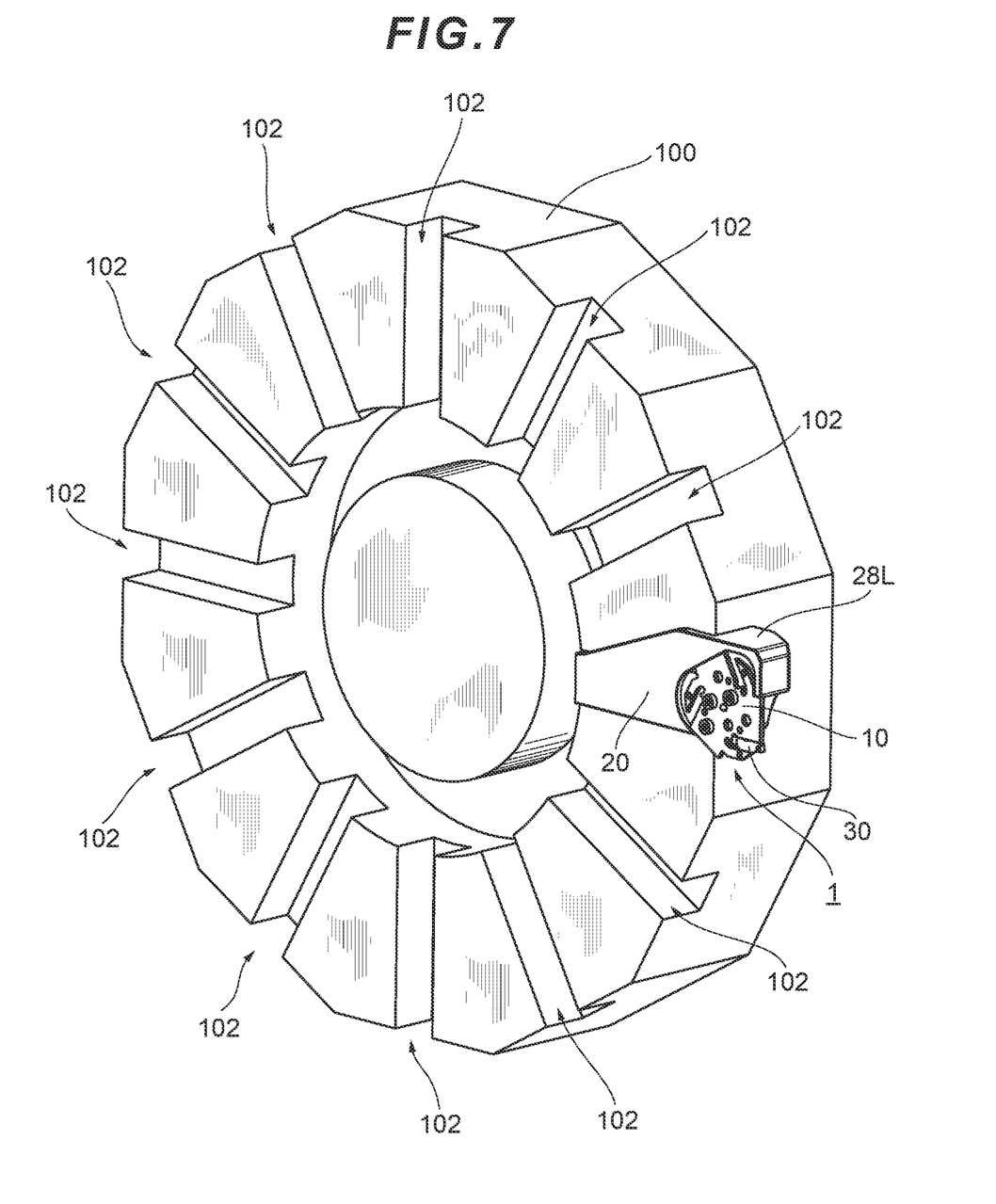
FIG. 7 is a is a perspective view depicting an example of a turret lathe on which the holder with the blade is installed.

The outline of a cutting tool 1 and a lathe device on which this cutting tool 1 is installed according to the present disclosure follows. The cutting tool 1 is constituted of an insert 30, a blade (plate-like member) 10 that holds the insert 30, and a holder 20 that holds the blade 10. The insert 30, which is used for such cutting machining as grooving and cutting off, is held by an insert pocket 11 of the blade 10 (see FIG. 1 and the like). The blade 10 is installed at a predetermined position of the holder 20, such as a position in the vicinity of the front end of the holder 20 in the longitudinal direction X, and on a side face along the width direction Y (see FIG. 3 and the like). The cutting tool 1 is installed at a predetermined position of the lathe device, such as a turret lathe 100 (see FIG. 7 and the like).

Blade

The blade 10 of this embodiment is a plate-like member that is installed at a predetermined position of the holder 20. The blade 10 includes: a plurality of (three in the case of this embodiment) insert pockets 11; recess portions 12 at three locations, each of which is formed by partially cutting the corresponding insert pocket 11 respectively; a pin hole 13; and bolt holes 14 (see FIG. 1, FIGS. 5A to 5E and the like).

Figure 1:
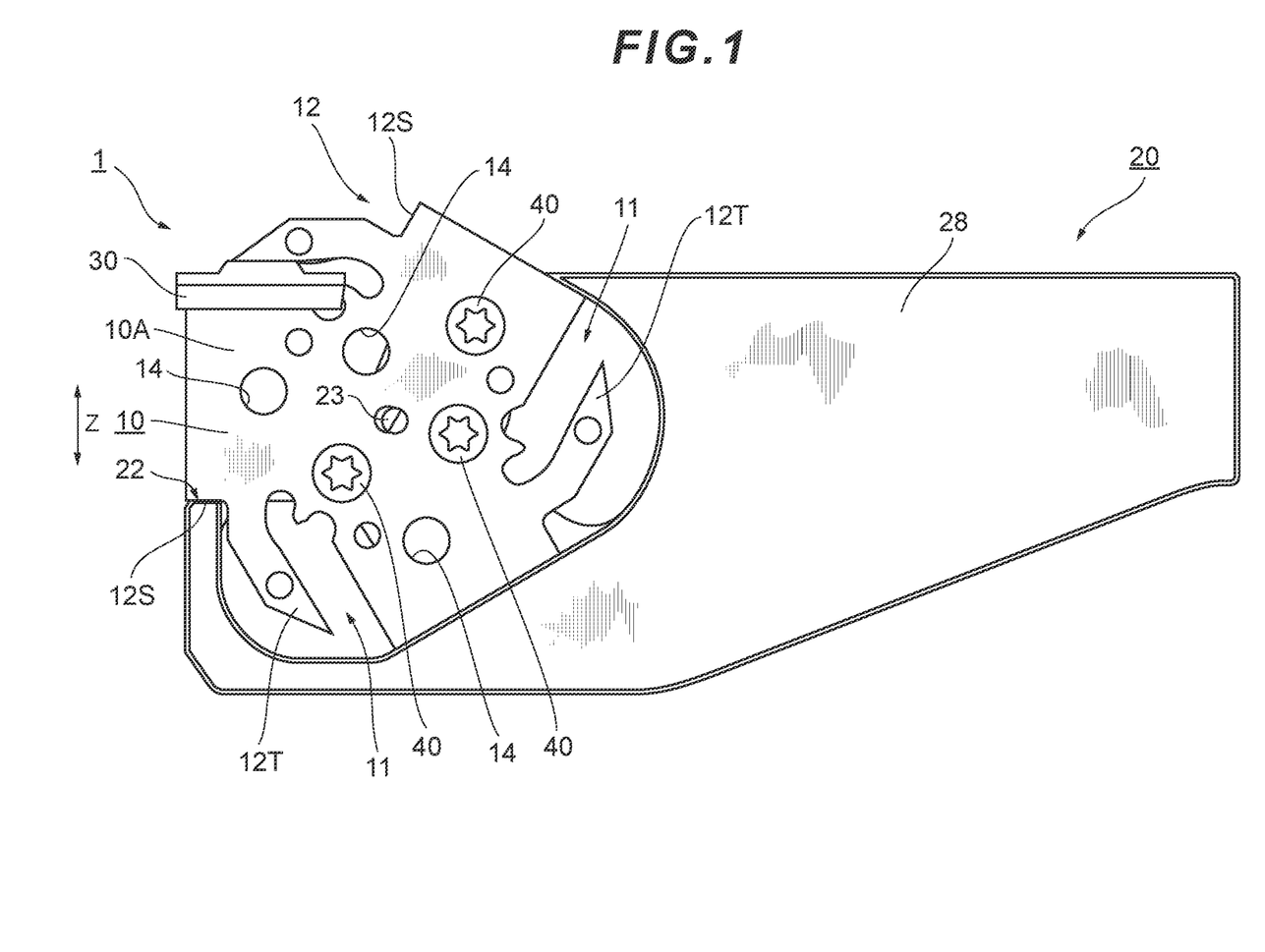
FIG. 1 is a diagram depicting an example of a blade (plate-like member) used for a cutting tool and a holder in which the blade is installed, viewed on the side of the front face of the blade (opposite side of surface installed in the holder)
Figure 2:
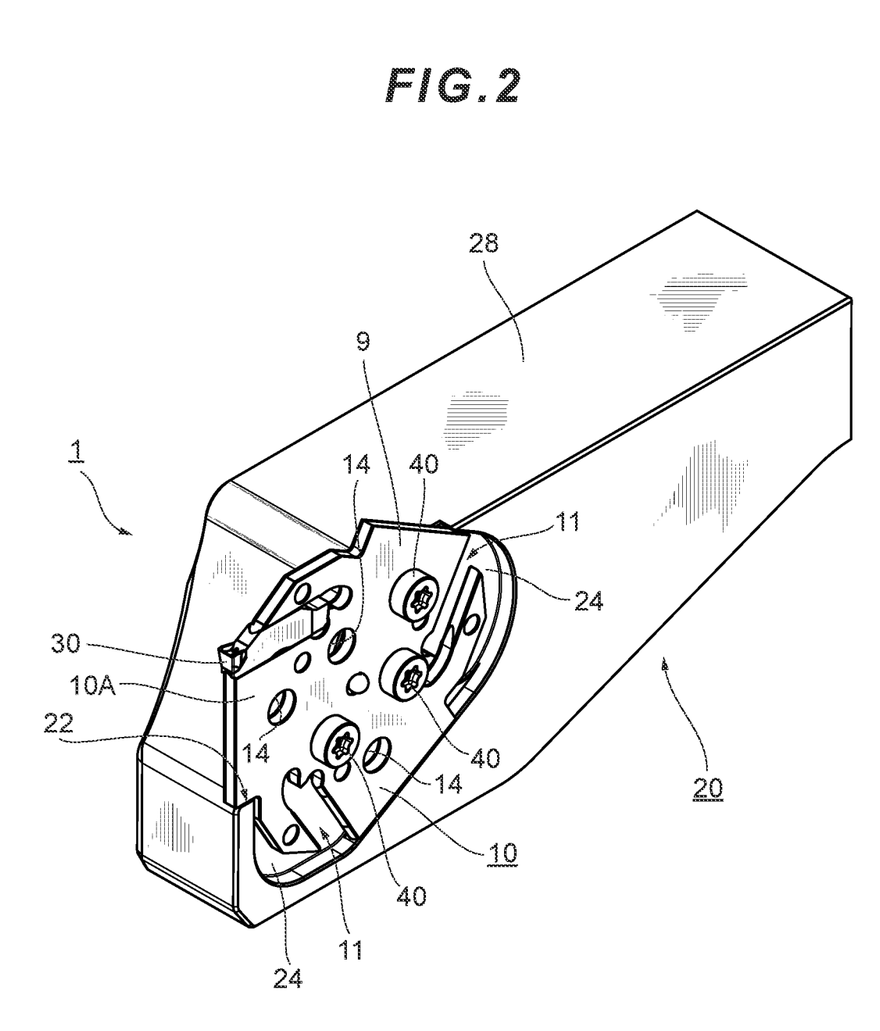
FIG. 2 is a perspective view depicting an example of the holder in which the blade is installed, viewed in an angle at which the front face of the blade is observed.

The insert pocket 11 is formed as a groove in accordance with a shape and size of the insert 30 to be installed (see FIG. 1, FIG. 2 and the like). In this embodiment, the three insert pockets 11 are disposed in the peripheral direction at equal intervals (at every 120°) for an approximately triangular blade 10, and by rotating the blade 10 by 120°, the insert 30 can be held by any one of the insert pockets 11 in the same manner (see FIG. 1 and the like). Therefore a plurality of pockets can be used for one blade 10, that is, even if a peripheral portion of an insert pocket 11 of the blade 10 is damaged, for example, another insert pocket 11 can be used by rotating the blade 10.

The recess portion 12 is a portion of the polygonal-shaped (approximately triangular in the case of this embodiment) blade 10 that is partially cut off. In this embodiment, the recess portion 12 is formed by cutting off a portion in a predetermined shape from each of the three apex portions of an approximately triangular blade 10 (each of the three corners has an R shape). (See FIGS. 5A to 5E and the like. In FIGS. 5A to 5E, the range of each recess portion 12 in an original plate-like member before cutting off is indicated by a two-dot chain line. Normally only the range indicated by the broken line in FIG. 5A, for example, is removed in order to minimize the amount to be removed by cutting, but in this description it is assumed that the portion indicated by the two-dot chain line is removed as an example) In the recess portion 12, a portion that contacts with a support portion 22 of the holder 20 (hereafter referred to as "supported portion" and is denoted with reference sign 12S) is formed (see FIGS. 5A to 5E and the like). A portion constituting the outer side of the insert pocket 11 (referred to as an "insert pressing portion" and is denoted with reference sign 12T in this description) is cut off to form the recess portion 12, and the dimension h becomes smaller accordingly (see FIGS. 5A to 5E). The size and shape of the recess portion 12 and the size and shape of the insert pressing portion 12T are determined considering the magnitude of force applied to the insert pressing portion 12T during machining, for example (see FIG. 3 and the like).

Figure 6:
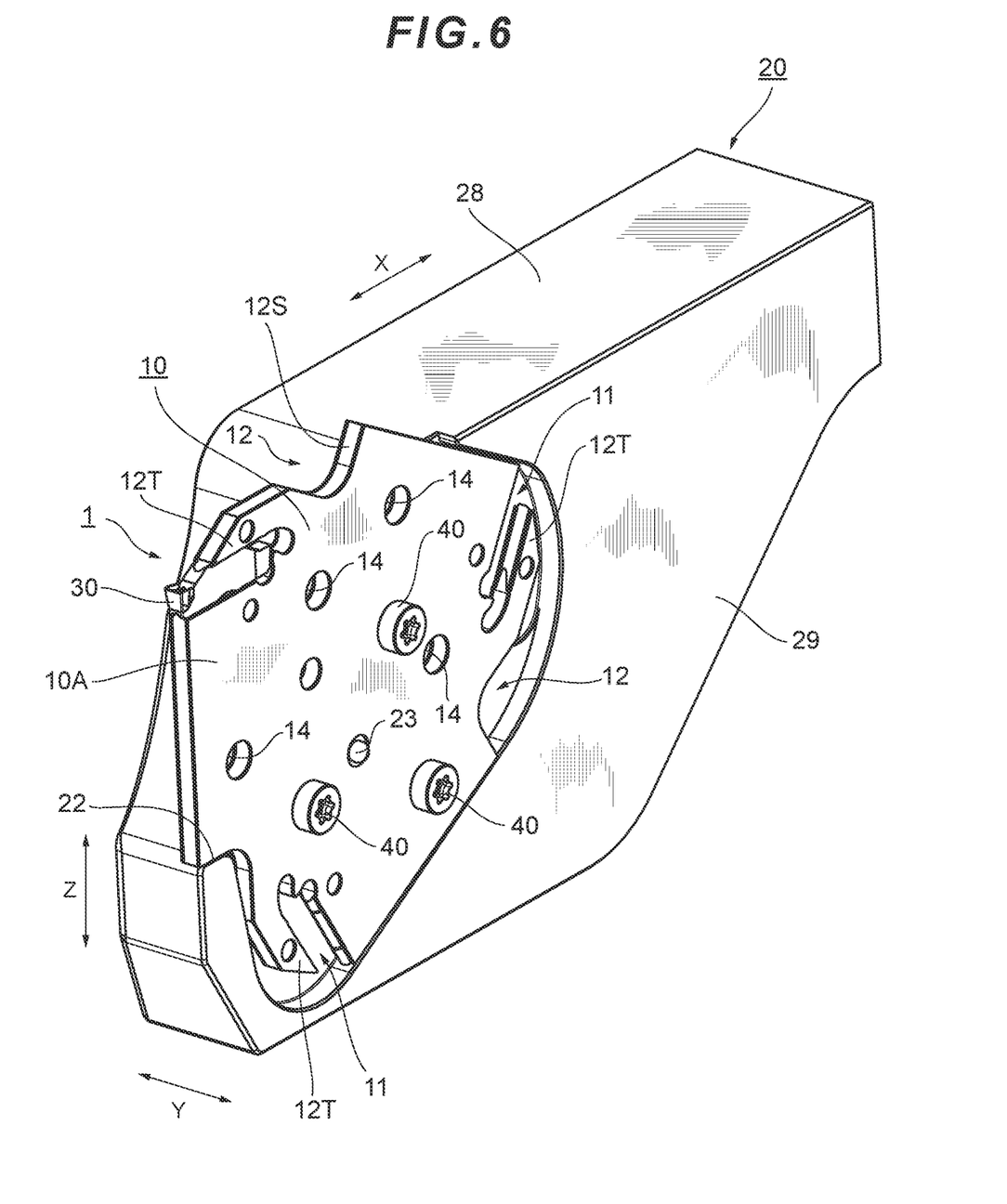
FIG. 6 is a perspective view depicting another embodiment of the blade and the holder.

The pin hole 13 is formed at the center of the blade 10. When the blade 10 is installed in a blade installing portion 21 of the holder 20, a side thrust pin (positioning projection) 23 of the holder 20 is fitted into the pin hole 13, whereby the blade 10 is positioned. As the blade 10 of another embodiment (see FIG. 6) which will be described later, the pin hole 13 may be disposed at a position other than the center. In the present embodiment, a bolt hole 14 (a part of the bolt hole 14) may also be used as the pin hole 13.

The bolt hole 14 is a hole that is formed in a blade 10 for a cap bolt (fastening member) 40 to be inserted (see FIG. 2 and the like). In the present embodiment, a plurality of (e.g. six) bolt holes 14 are formed in the blade 10 in advance. Thereby even if the blade 10 is rotated by 120°, a predetermined number (three in the case of the present embodiment) of cap bolts 40 can be inserted into a predetermined number (three in the case of the present embodiment) of bolt holes 14 out of the plurality of bolt holes 14, and be fastened to bolt fastening holes 26 of the holder 20 via a predetermined number (three in the case of the present embodiment) of cap bolts 40 (see FIG. 3 and the like).

Holder

The holder 20 of the present embodiment includes the blade installing portion 21, the support portion 22, the side thrust pin 23, the relief portion 24, a constraint surface 25, the bolt fastening hole 26, a concave portion 27, a shank (holder main portion) 28, a rib 29 and the like.

The blade installing portion 21 is a portion that is formed as a region where the blade 10 is installed. In the present embodiment, the concave portion 27 is formed on the side face portion of the holder 20, which is in the vicinity of the front end of the holder 20 in the longitudinal direction X and is along the width direction Y, as mentioned above, and a part of the blade 10 is set in this concave portion 27 which functions as a blade installing portion 21 (see FIG. 3 and the like). The blade 10 is installed in the holder 20 such that the rear face 10B of the blade 10 faces the concave portion 27, and a part of the rear face 10B is contacted with the surface 27A (also referred to as "contact surface") of the concave portion 27 of the holder 20.

The support portion 22 is a region that is formed at a position to receive a part of the force that is applied to the blade 10 when cutting is performed using this cutting tool 1. For example, a step portion, which protrudes in the width direction Y from the concave portion 27, is formed in a vicinity of the front end of the holder 20 in the longitudinal direction X and in the vicinity of an intermediate position in the height direction Z (see FIG. 3), and this step portion is used as the support portion 22 that contacts with a supported portion 12S of the blade 10. In a case of the cutting tool 1 having the configuration illustrated in FIG. 3 and the like, a large external force is applied from the insert 30 in the height direction Z when cutting is performed (see FIG. 3). Considering this, in the present embodiment, the support portion 22 is formed so as to sufficiently withstand this external force that is applied in the height direction Z via the insert 30 and the blade 10. It is preferable that this support portion 22 is disposed behind the cutting edge of the insert 30 along the height direction Z when the cutting is performed (see FIG. 1). It is also preferable that the support portion 22 is formed as a plane (or a curved surface close to a plane) that is vertical to the height direction Z (see FIG. 1, FIG. 3 and the like).

Further, since the support portion 22 is formed on the edge of the holder 20 or in the vicinity thereof (specifically, on the front end of the holder 20 in the longitudinal direction X or in the vicinity thereof), as mentioned above, the contact surface of the concave portion 27 (surface of the concave portion 27 that contacts with the rear face of the blade 10) can be formed up to a part near the support portion 22 in the holder 20 of the present embodiment. According to this holder 20, the rear face 10B of the blade 10 can be contacted up to the part near the support portion 22 because of the contact surface 27A, hence deflection of the blade 10 in the thickness direction during machining (mainly bending of a part of the insert pressing portion 12T in the width direction Y of the holder 20) and chattering can be more easily controlled. This is advantageous particularly in stabilizing machining in high feeds.

Figure 3:
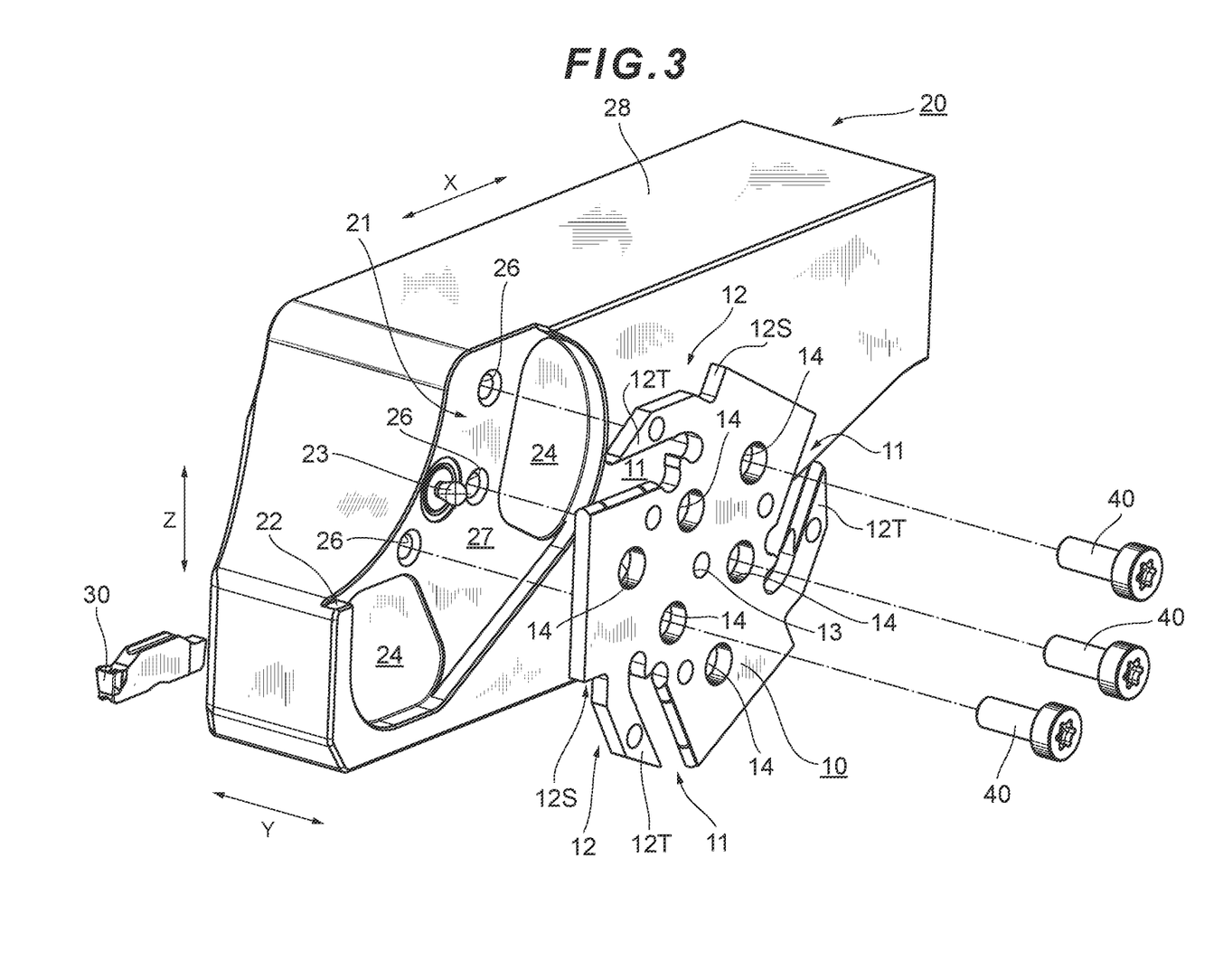
FIG. 3 is an exploded perspective view of the blade and the holder.

The side thrust pin 23 fits into the pin hole 13 of the blade 10 and positions the center of the blade 10 when the blade 10 is installed in the blade installing portion 21 of the holder 20 (see FIG. 3 and the like). The side thrust pin 23 may be formed such that a part or all of the side thrust pin 23 is tapered.

The relief portion 24 is formed in a part of the contact surface 27A of the concave portion 27 of the holder 20 where the blade 10 is installed. The relief portion 24 is a concave portion that is lower, by one step, in a part (e.g. two locations) of the contact surface 27A, so as to be concaved in the thickness direction of the blade 10 (in other words, concaved in the width direction Y of the holder 20) (see FIG. 3 and the like). The relief portion 24 is formed at a predetermined depth, so that even if a part of the blade 10 (most likely the insert pressing portion 12T) is deflected for a predetermined amount in the thickness direction due to the influence of machining, this deflected portion of the blade 10 does not contact with the holder 20. Therefore according to the holder 20 of the present embodiment, the blade 10, which is partially bent in the width direction, can be installed in the concave portion 27 such that the deflected portion is confined to the relief portion 24 without generating any rattling. Another advantage of forming the relief portion 24, besides enabling the installation of the blade 10 which was partially bent due to the influence of machining, is that even if chips adhere to the insert pressing portion 12T and if this adhesion exceeds the blade plate thickness, the blade can be installed if the adhesion is within a certain thickness. The deflection of the blade 10 is most likely generated in the insert pressing portion 12T, hence in the present embodiment, the relief portion 24 is formed at each position corresponding to the two insert pressing portions 12T, which are not used for machining, out of the three insert pressing portions 12T (see FIG. 3 and the like).

Figure 4:
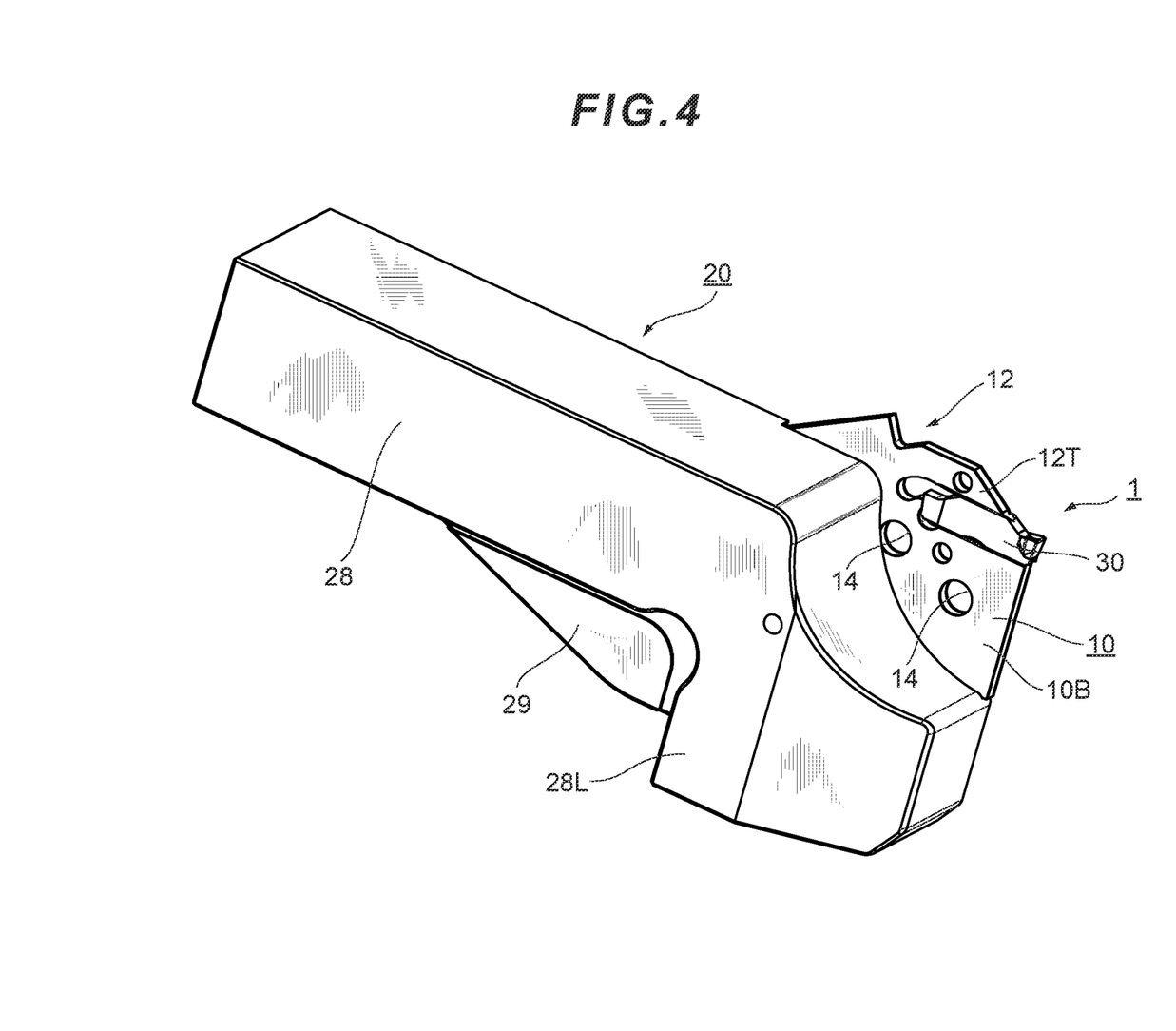
FIG. 4 is a perspective view depicting an example of the holder in which the blade is installed, viewed in an angle at which the rear face of the blade is observed.
Figures 5A, 5D:
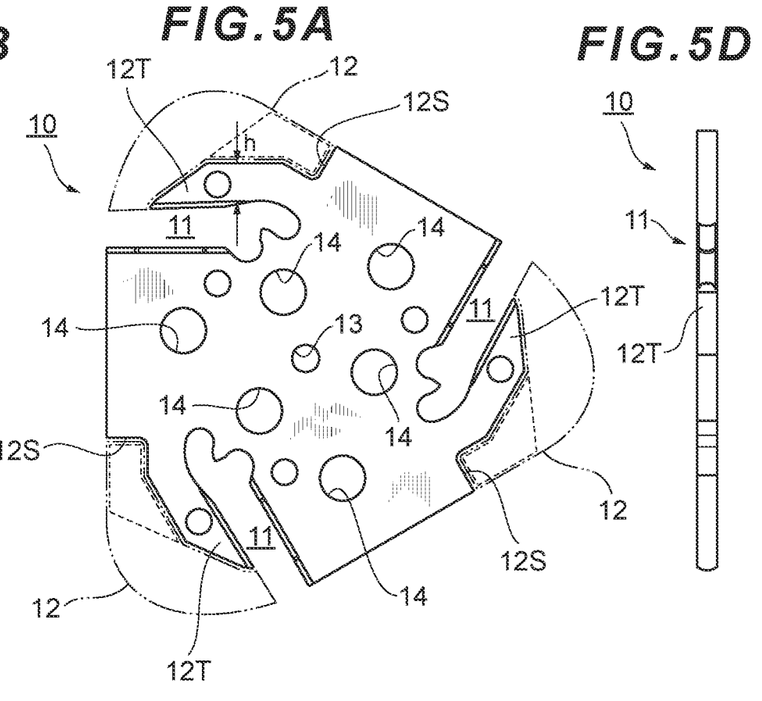
FIG. 5A is a diagram depicting an example of the blade used for the cutting tool, which is a view from the front face.
FIG. 5D is a diagram depicting an example of the blade used for the cutting tool, which is a view of a side face thereof from the right.
Figure 5B:
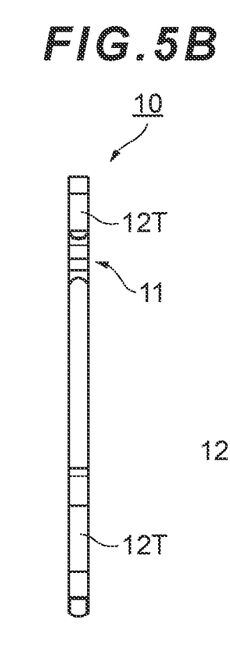
FIG. 5B is a diagrams depicting an example of the blade used for the cutting tool, which is a view of a side face thereof from the left.
Figure 5C:
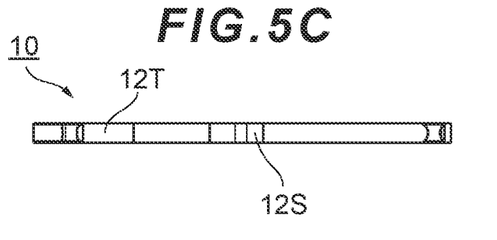
FIG. 5C is a diagram depicting an example of the blade used for the cutting tool, which is a view of a side face thereof from the top.
Figure 5E:
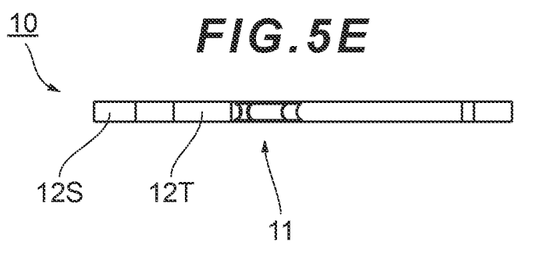
FIG. 5E is a diagram depicting an example of the blade used for the cutting tool, which is a view of a side face thereof from the bottom.
Figure 8:
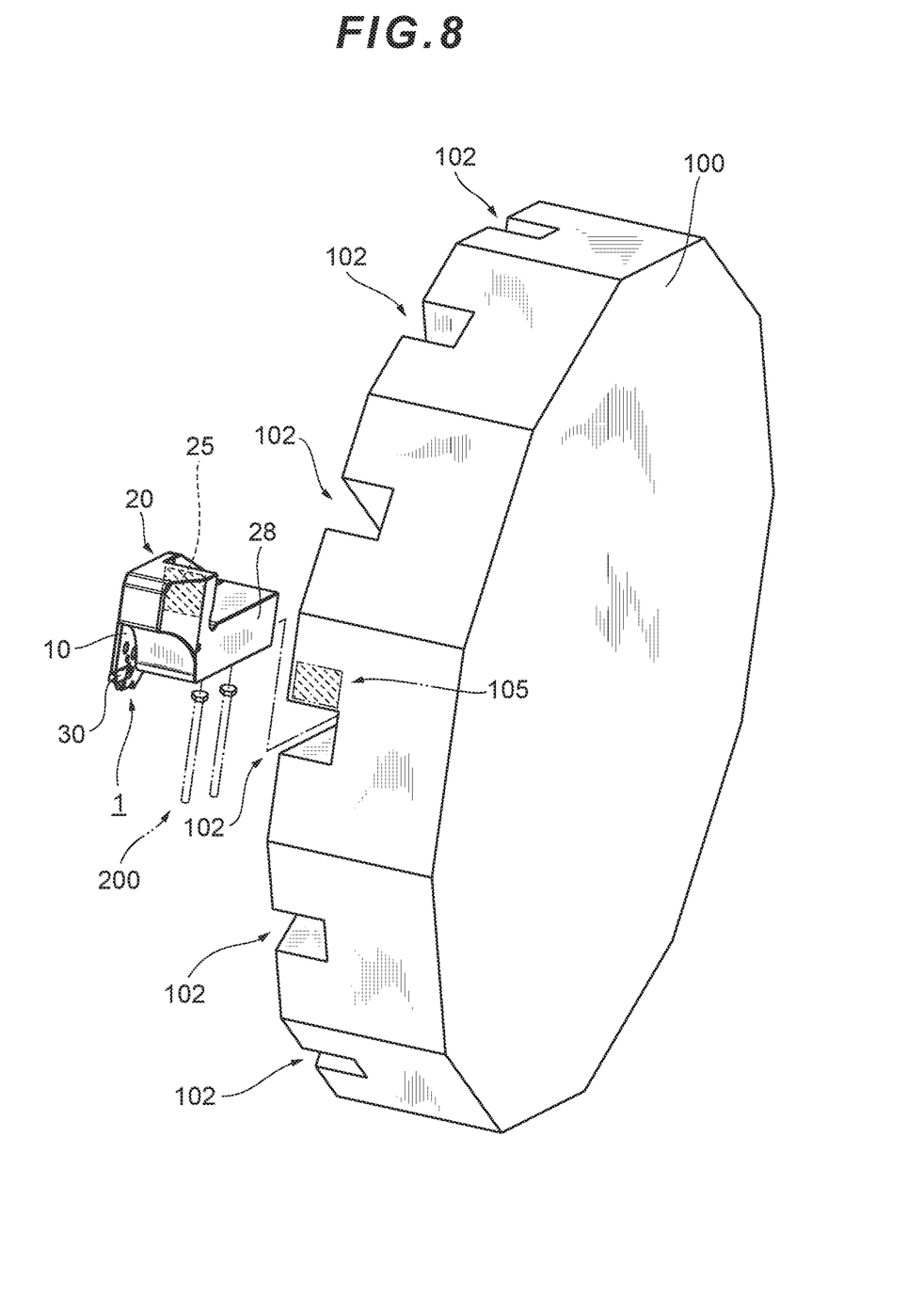
FIG. 8 is a perspective view depicting the turret lathe illustrated in FIG. 7, viewed from the opposite side (rear face side of the blade)
Figure 9:
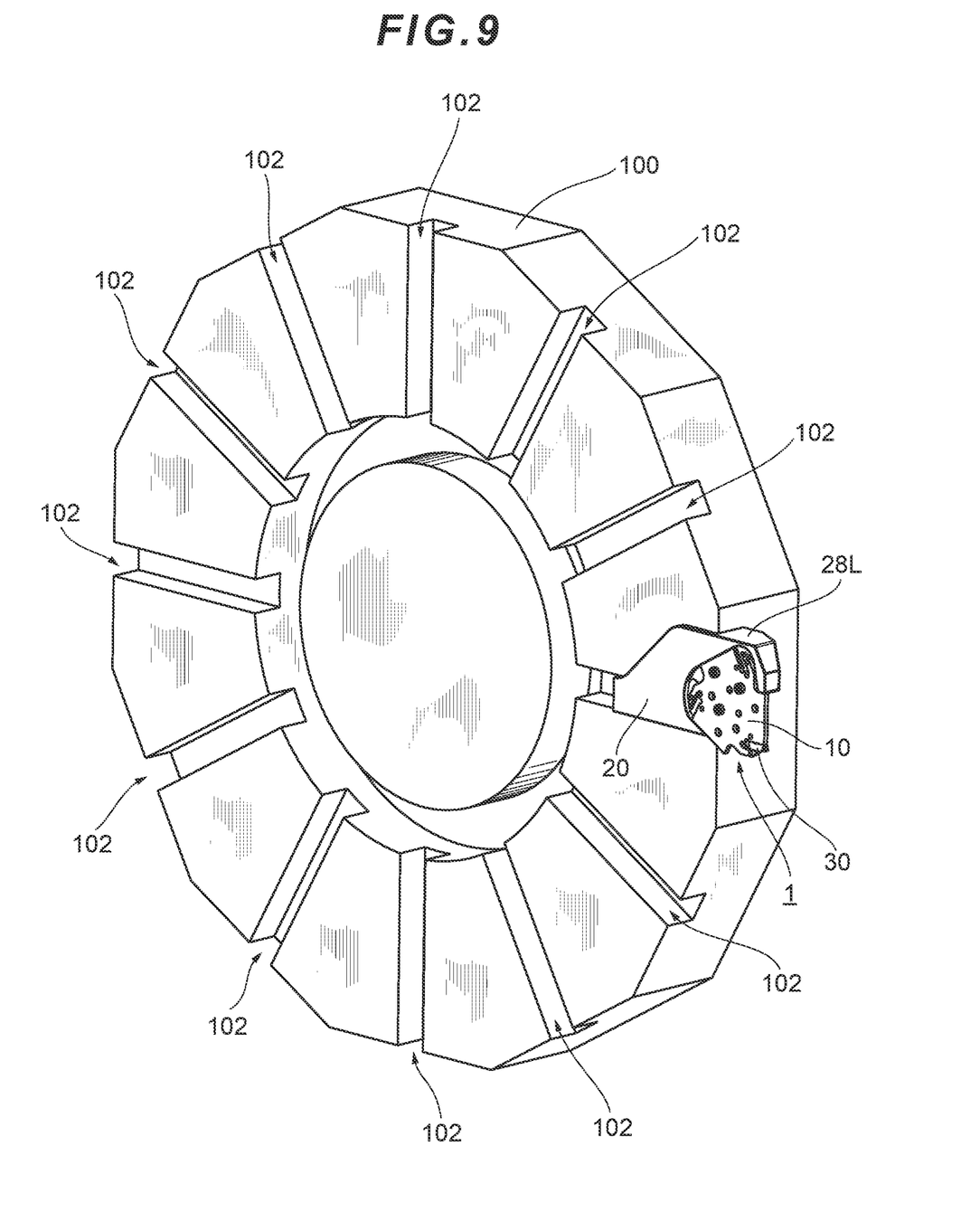
FIG. 9 is a perspective view depicting another embodiment of the turret lathe.

The constraint surface 25 contacts with a part of a turret lathe 100 on which the holder 20 is installed, and is formed so as to restrict the movement of the holder 20 in the longitudinal direction X. For example, the constraint surface 25 is inserted into a holder installing groove 102 of the turret lathe 100. A hook portion 28L, which protrudes in the direction vertical to the longitudinal direction X (e.g. height direction Z of the holder 20), is disposed in the shank (holder main portion) 28, which is an installing portion extending in the longitudinal direction X (see FIG. 4 and the like), and the constraint surface 25 is formed in the hook portion 28L (see FIG. 8 and the like). When the shank 28 of the holder 20 is inserted into the holder installing groove 102 of the turret lathe 100, the constraint surface 25 contacts with a constraint surface 105 on the outer periphery of the turret lathe 100, whereby the movement of the holder 20 in the longitudinal direction X (that is, the diameter direction of the turret lathe 100) is restricted, and the holder 20 is positioned at a predetermined position. The holder 20 is installed in the turret lathe 100 using a fastening jig, such as bolts 200 (a shape and a number of bolts illustrated in FIG. 8 are merely examples) (see FIG. 8, FIG. 9 and the like).

The rib 29 is formed in the constraint surface 25 or the vicinity thereof, and functions as a reinforcing member that improves the strength of the holder 20. In the present embodiment, the bracket-shaped rib 29 is disposed so as to connect the shank 28 and the hook portion 28L (see FIG. 4 and the like). This rib 29 is disposed on one side (e.g. side where the concave portion 27 is formed) of the holder 20 in the width direction Y, and can also function as a guide for the holder 20 when the holder 20 is installed in the turret lathe 100 (see FIG. 9 and the like).

Example of Use

The blade 10 is installed in the holder 20 and is used as a blade for cutting off and grooving machining. The holder 20 in which the blade 10 is installed is fixed to the turret lathe 100 using the jig (e.g. bolts 200), just like a regular machining tool, whereby the movement in the lateral direction (height direction Z of the holder 20) is restricted, and the movement in the longitudinal direction X is also restricted by the above mentioned constraint surface 25.

As mentioned above, according to the cutting tool 1 of the present embodiment that uses a polygonal-shaped blade 10, including each recess portion 12 formed by cutting a part of the corresponding insert pocket 11, improvement of the machining conditions and increasing the quality of the machined surfaces can be implemented, particularly in cutting off and grooving machining when the projection amount of the blade 10 is large. The principle to implement this improvement of the machining conditions and increase in the quality of the machined surfaces will be described below.

Principle

The deflection amount δ of the cutting tool 1 depends on the tool projection amount L and cross-sectional secondary moment. In the case of the cutting tool 1 for cutting off and grooving machining in particular, the tool projection amount L is limited by the constraints of the machining diameter. The deflection of the cutting tool 1 can be decreased by increasing the tool height h and making the holder projecting portion thicker than the blade thickness, so as to increase the cross-sectional secondary moment.

$$\delta = \frac{4 \times F \times L^3}{E \times b \times h^3} \qquad [\text{Math. 1}]$$

δ: tool deflection amount [mm]
F: cutting resistance [N]
L: tool projection amount [mm]
E: Young's modulus [MPa]
b: tool thickness [mm]
h: tool height [mm]

According to the above mentioned cutting tool 1 of the present embodiment, the recess portion 12 of the blade 10 and the support portion 22 of the holder 20 contact, whereby the position of the blade 10, with respect to the holder 20 (particularly the positions in the height direction Z and the longitudinal direction X, specifically the position around the axis at the side thrust pine 23), is restricted. Further, the blade 10 can be constrained by the holder 20 configured such that the projection amount from the end face of the tool rest (turret lathe 100 in the case of the present embodiment) to the front end of the holder is larger than the blade width. By holding and constraining the blade 10 by the above mentioned holder 20, the blade can be constrained by the holder 20 of which tool thickness b is thick and rigidity is high, and the deflection amount of the tool to the bottom face side (to the height direction Z side) can be decreased.

According to the cutting tool 1 of the present embodiment, the surface of the holder 20 is constrained by the turret lathe 100 in the longitudinal direction X, and can withstand even if a large cutting resistance is applied, hence machining can be performed under a stricter conditions than conventional machining conditions that are conventionally set. This results in not only the above decrease in the deflection amount of the tool, but also in considerable improvement in the quality of the machined surface and in the straightness of cutting during machining under more strict machining conditions. Furthermore, this cutting tool 1 includes a plurality of insert pockets 11 in the blade 10, hence economic efficiency is also high compared with conventional two-pocket type cutting blades.

The above mentioned embodiment is an example of a preferable embodiment of the present disclosure, but the present disclosure is not limited to this, and the above embodiment may be modified in various ways without departing from the spirit and scope of the present disclosure. For example, in the above embodiment, the blade 10 and the holder 20 used for the cutting tool 1, which is particularly suitable for cutting off and grooving machining, was described, but the present disclosure is applicable not only to such machining tools but also to rotary cutting tools, such as a side cutter.

The present disclosure is suitably applicable to a cutting tool 1 for machining, such as for cutting off and grooving machining, and for a blade 10, a holder 20 and the like used for this cutting tool 1.

What is claimed is:

1. A holder that holds a plate-like member and an insert used for cutting machining, wherein:
   the plate-like member comprises
   a plurality of insert pockets, wherein the insert is configured to be held by any one of the plurality of insert pockets; and
   recess portions formed by partially cutting off a portion in a predetermined shape from an insert pressing portion constituting an outer side of the plurality of insert pockets in each of a plurality of apex portions of the plate-like member, respectively corresponding to the plurality of insert pockets, and the plate-like member has a polygonal shape and is used for cutting off and/or grooving machining,
   wherein the holder comprises a holder main portion and a support portion; and
   the holder is configured so that the plate-like member can be installed in a state where a surface portion formed in one of the recess portions is supported by a corresponding surface portion of the support portion of the holder.

2. The holder according to claim 1, wherein the support portion is formed at a position where a part of force applied to the plate-like member is received during machining.

3. The holder according to claim 2, wherein the support portion is formed on an edge of the holder.

4. The holder according to claim 1, further comprising a positioning projection that determines a position of the plate-like member when the plate-like member is installed in the holder.

5. The holder according to claim 1, wherein, in a part of a portion where the plate-like member is installed, a relief portion that is concaved in a thickness direction of the plate-like member is formed.

6. The holder according to claim 5, wherein the relief portion is formed at a predetermined depth where a deflected portion of the plate-like member, which is deflected for a predetermined amount in the thickness direction due to an influence of machining, is not contacted.

7. The holder according to claim 1, further comprising a constraint surface that contacts with a part of a lathe device in which the holder is installed, and restricts movement of the holder in a longitudinal direction.

8. The holder according to claim 7, further comprising a rib that is formed on the constraint surface or a vicinity thereof.

* * * * *